Sept. 5, 1961
J. H. ROBERTS
2,999,187
DIFFERENTIAL FAULT SENSING CIRCUIT
Filed June 13, 1960
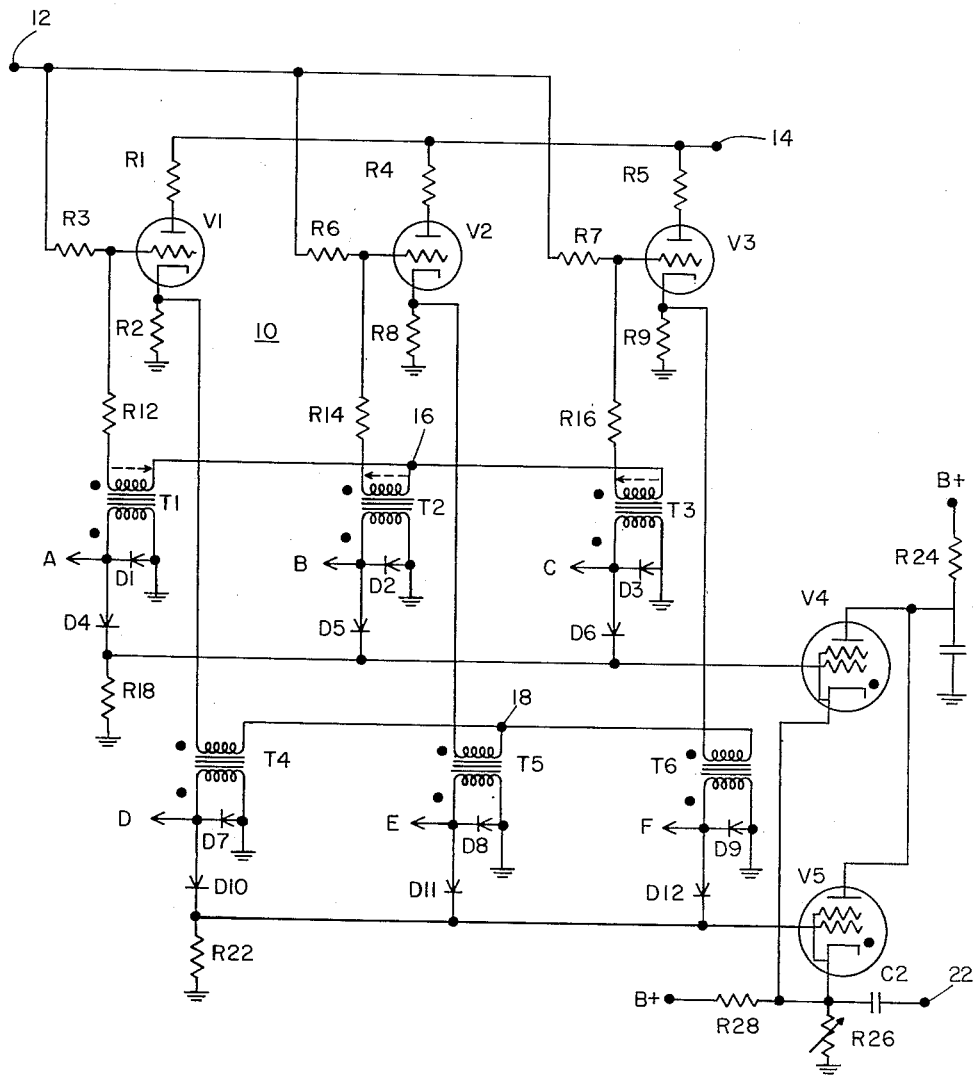
INVENTOR.
JOSEPH H. ROBERTS
BY

United States Patent Office 2,999,187
Patented Sept. 5, 1961

2,999,187
DIFFERENTIAL FAULT SENSING CIRCUIT
Joseph H. Roberts, Erlton, N.J., assignor, by mesne assignments, to the United States of America as represented by the United States Atomic Energy Commission
Filed June 13, 1960, Ser. No. 35,856
9 Claims. (Cl. 315—163)

The present invention relates to a differential fault sensing circuit and more particularly to a differential fault sensing circuit for detecting gas arcing in high voltage vacuum tubes.

The circuit of this invention is particularly applicable to detecting faults in parallel arranged high vacuum tubes connected to a power source which has a very high fault current capability. These tubes have electrodes which are closely spaced and have relatively small mass and the fault system is designed to protect these tubes from damage in the event of internal gas arcing. An amplifier employing the thermionic tubes to which this invention is applicable is normally in pulsed operation so that it is not convenient to make the operation of a fault sensing circuit dependent upon the absolute level of the fault current. Furthermore it is desirable to provide some sort of reliable indication of which tube is involved in the arcing and, additionally, the wave forms existing during the normal operation of the amplifier should not affect the sensitivity of protection. For accomplishing these results, this invention uses a circuit which is sensitive to the differences in voltage appearing between corresponding elements likely to fault in the vacuum tubes being protected. Provided that the sensitivity of the inventive circuit is set at some level above which arcing will cause detectable differences in voltage, normal operation of the amplifier will not actuate the inventive fault sensing circuit.

It is accordingly a first object of this invention to provide a fault sensing circuit for use with amplifying tubes in parallel to detect unbalancing voltages appearing on respective elements of the tubes.

Another object of this invention is the provision of a fault detecting circuit for responding quickly to internal gas arcing of a thermionic tube.

It is still another object of this invention to provide circuit protection apparatus for power amplifying tubes.

Other objects and advantages of this invention will hereinafter become more evident as the invention becomes better understood in the light of the following detailed description to be considered with reference to the accompanying drawing which illustrates one embodiment of this invention.

Referring to the drawing, there is shown an amplifier 10 consisting of triodes V1, V2 and V3 connected in parallel. Amplifier 10 is designed for use in operation at high plate voltages and is energized from a power source of very high current capability thereby making it necessary to provide suitable fault detection apparatus associated with the amplifier tubes to insure their protection in the event of internal gas arcing due to the occurrence of a fault. Triodes V1, V2 and V3 are selected for use in amplifier 10 for their high gain and frequency performance characteristics, an example of such a tube being one having the designation A-15030 whose electrodes are closely spaced and have relatively small mass. In the event of arcing within any one of these tubes damage to one or more of them will result unless, in very rapid response to the development of the arcing, the high current is dumped out of the arcing tube so that a minimum of energy is dissipated on the electrodes therein.

Referring back to the drawing, it is seen that each of the triodes V1, V2 and V3 is provided with the usual plate, grid and cathode elements. Triode V1 is provided with a plate resistor R1, a resistor R2 connecting the cathode to ground, and a grid resistor R3. In similar fashion triodes V2 and V3 are provided with plate resistors R4 and R5, grid resistors R6 and R7 and cathode resistors R8 and R9, respectively. These triodes are connected in parallel as illustrated with the grids thereof receiving the input from a common contact 12 while the output is taken from a common contact 14. It is understood that the power source or B+ supply is connected in at this point. The fault detection or sensing circuit applicable for use with amplifier 10 is shown in the drawing and consists of pulse transformers T1, T2, T3, T4, T5 and T6 (preferably 1:1 turns ratio) in combination with a pair of thyratron tubes V4 and V5. Transformers T1, T2, and T3 are connected in parallel with their primaries having one common connection at 16. The opposite end of the primary of transformer T1 is connected through a resistor R12 to the grid of triode V1 while the opposite primary ends of transformers T2 and T3 are connected to the grids of V2 and V3 through resistors R14 and R16, respectively, as illustrated. Resistors R12, R14 and R16 limit the rise of voltage in the sensing circuit to non-destructive heights. This is necessary because the impedance looking back from each of the grids of triodes V1, V2 and V3 is relatively high.

The secondaries of transformers T1, T2 and T3 have a common connection to ground and semiconductor diodes D1, D2 and D3 across the secondaries of transformers T1, T2 and T3 respectively, oriented in a common current direction from ground as indicated. Black dots indicate the relative polarities of the primaries and secondaries. The dotted ends of the secondaries of transformers T1, T2 and T3 are connected to the control grid of thyratron V4 through semi-conductor diodes D4, D5 and D6, respectively. A resistor R18 connected from the grid of thyratron V4 to ground developes the voltage for use on the grid. As indicated by arrows A, B and C pulses developed on the cathodes of semi-conductor diodes D1, D2 and D3 may be delivered separately for a purpose to be later described.

In a similar fashion transformers T4, T5 and T6 are connected in parallel with their primaries having a common connection 18 at one end and connected respectively to the cathodes of the triodes V1, V2 and V3 at their opposite, dotted ends. No resistors are needed in the connecting leads to the cathodes because resistors R2, R8 and R9 in the cathode circuits of the triodes are small in comparison to R1, R4, and R5 which results in a large voltage division at the cathodes. The secondaries of transformers T4, T5 and T6 are short circuited by diodes D7, D8, D9, the anodes thereof being grounded along with one end of each transformer secondary as shown. Output diodes D10, D11 and D12 are connected from the dotted ends of the secondaries to the control grid of thyratron D5 in a forward going direction. A resistor R22 grounds the control grid of thyratron D5. Arrows D, E and F serve a similar function as arrows A, B and C as will be later described.

Thyratrons V4 and V5 are connected in parallel with their anodes connected through a resistor R24 to power supply B+. Their cathodes are connected in common through a resistor R26 to ground across which the voltage is developed for use in energizing a firing circuit (not shown) connected from contact 22 and capacitor C2. Resistor R26 may be variable to adjust the sensitivity of threshold of the fault detecting or sensing circuit. The cathodes of thyratrons V4 and V5 are connected through a resistor R28 to B+ to maintain thyratrons V4 and V5 effectively in a standby condition. A positive pulse on the grid of thyratron V4 of sufficient magnitude, for example, will cause firing and conduction in thyratron V4. Due to increased current through resistor R26 the voltage thereacross will increase, delivering a pulse by way of contact 22 to cause the actuation of the firing circuits (not shown). The latter, as is understood in the art, will dump the current being delivered to amplifier 10 thereby protecting triodes V1, V2 and V3 from damage. While not shown, it is understood that suitable current absorbing apparatus such as large ignitrons or similar devices known in the art having high current capacity would be used to absorb the current or energy harmlessly in order to divert energy from the arcing.

The operation of the circuit hereinabove described is as follows. During normal operation of amplifier 10 there is no potential difference at any particular instant from grid to grid or cathode to cathode of triodes V1, V2 or V3. Assume that arcing has occurred between the anode and the grid of triode V1. This gas arcing will result in that particular grid going more positive than the grid of the other two tubes. This will produce a positive going pulse through transformer T1 primary moving in the current direction indicated by the dotted arrow there shown. As indicated by the other dotted arrows showing the direction of current flow in the primaries of transformers T2 and T3 a pulse in the primary of T1 is in opposite direction to the current flow in the other primaries. This results in a voltage polarity across the secondary of transformer T1 rendering diode D1 nonconducting thereby delivering a current pulse through diode D4 to the grid of thyratron V4. This causes the latter to conduct and actuation of the firing circuit as hereinbefore described. The polarity across transformers T2 and T3 are in opposite direction to that of transformer T1 so that semiconductor diodes D2 and D3 act to short circuit any pulses and prevent delivery of pulses through diodes D5 and D6. The pulse delivered across transformer T1 is also delivered as indicated by arrow A to another thyratron (not shown) which may be provided to indicate which of the triodes V1, V2 and V3 has the fault therein and which electrode thereof is involved. This thyratron (not shown), receiving the pulse by way of arrow A, may be biased in such a manner, as is understood in the art, to hold the information as to which tube faulted until manually reset. Of course, this information may also be used as a secondary means of actuating the overload circuitry. Thyratrons (not shown) may be similarly connected to each of the transformers T2 to T6 to indicate the location of any arcing.

The arrangement described above insures that arcing at both the grids and cathodes of triodes V1, V2 and V3 will be detected. If in a particular application of this invention it is deemed that arcing at the cathode will not occur, then the use of transformers T4, T5 and T6 will not be necessary.

The differential fault sensing circuit hereinabove described is capable of functioning to start the ignitrons or other energy absorbing devices within a short interval of time, such as, ten microseconds. The construction shown is relatively simple and not dependent on thermionic devices which can themselves suffer a fault. As the apparatus functions on the differential values of voltages in the various amplifying elements problems of calibration based on absolute values and the consequent difficulties involved in the adjustment of threshold levels are eliminated. The only adjustment necessary for the use of this circuit is in the thresholds of V4 and V5 which may by the simple expedient of adjusting the value of resistor R26 be accomplished.

It should be understood that the foregoing relates only to a preferred embodiment of this invention and that numerous modifications and alterations thereof may be made without departing from the spirit and scope of the invention as set forth in the appended claims.

I claim:

1. A fault detection circuit for use with at least two thermionic active elements connected in parallel, each said element provided with at least a cathode, anode, and a control grid, comprising, pulse transformer means for each of said active elements, each of said transformer means having primary and secondary coils, the primary coils of said transformer means being connected electrically in parallel with one end of each primary coil connected in common and the other end of each primary coil connected to a similar electrode, respectively, in each of said elements for being exposed to the voltage changes thereon, means connected to said secondary coils for passing a voltage pulse in response to an overvoltage on an electrode connected to one of said transformer primary coils, and means responsive to said pulse for triggering overload circuitry to indicate a fault in one of said active elements.

2. The circuit of claim 1 in which the later means is adjustable for permitting selection of the threshold value of said pulse at which said triggering means is actuated.

3. A fault detection circuit for use with at least two thermionic active elements connected in parallel, each said element provided with at least a cathode, anode, and a control grid, comprising, a pulse transformer for each of said active elements, each having primary and secondary coils, the primary coils of said transformers being connected electrically in parallel with one end of said primary coils connected in common and the other ends of said primary coils connected to a similar electrode, respectively, in each of said elements for being exposed to the voltage changes thereon, the secondary coils of said transformers being connected in parallel with a common connection grounded, a diode connected across each of said secondary coils oriented to block current flow due to a positive pulse on its associated primary coil delivered by the respective electrode as a result of an overvoltage thereon compared to the voltages on the other respective electrodes, and triggering means having a control element connected to the ungrounded ends of said secondary coils for responding to a pulse delivered as a result of said overvoltage to produce a triggering impulse.

4. The fault detection circuit of claim 3 in which a common resistor is placed between the triggering means electrode and ground to develop the voltages thereacross for energizing said triggering means.

5. The fault detection circuit of claim 3 in which the primary coil connections are made to the control grids of said active elements through current limiting resistors.

6. The fault detection circuit of claim 3 in which there are a plurality of pulse transformers and an associated triggering means for the control grids of said active elements and a plurality of similar pulse transformers and an associated triggering means in the cathodes of said active elements operating concurrently.

7. The fault detection circuit of claim 3 in which means are provided to indicate which electrode has faulted.

8. The fault detection circuit of claim 3 in which the triggering means is a thyratron device having means for adjusting its threshold level.

9. The fault detection circuit of claim 3 in which each secondary coil is provided with a diode connecting the former to said triggering means control element to prevent reverse current flow.

References Cited in the file of this patent

UNITED STATES PATENTS 2,680,212   Frazier _____ June 1, 1954